G. H. Fuller,
Making Watch-Keys,
N° 47,811.   Patented May 23, 1865.

C.

D.

B.

D.

Witnesses.

Inventor.
George H. Fuller

UNITED STATES PATENT OFFICE.

GEORGE H. FULLER, OF PAWTUCKET, RHODE ISLAND.

IMPROVEMENT IN MANUFACTURING WATCH-KEYS.

Specification forming part of Letters Patent No. 47,811, dated May 23, 1865.

*To all whom it may concern:*

Be it known that I, GEORGE H. FULLER, of Pawtucket, in the county of Providence and State of Rhode Island, have invented a new and useful Improvement in the Method of Making Watch-Keys and Key-Pipes; and I do hereby declare that the following specification, taken in connection with the drawings, making a part of the same, is a full, clear, and exact description thereof.

Figure 1:
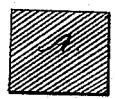
Figure 5:
Figure 4:
Figure 6:
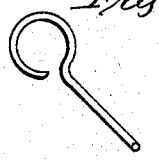
Figure 2:
Figure 3:
Figure 3:

Figure 1 represents a piece of sheet metal from which the tube of the key-pipe is to be formed. Fig. 2 represents the same sheet drawn into the form of a tube. Figs. 3 and 4 represent the pipe and key finished. Figs. 4 and 5 are parts to be referred to.

Key-pipes, as well as that variety of watch-key where the pipe and shank are of one piece, have heretofore been made from solid wire by drilling a longitudinal hole in the wire, which is then swaged to the proper size to fit the "square" of the watch. The foreign manufacturers of these articles, who supply the principal part of the consumption in this country, make use of wire of a gage higher than that which it is intended the pipe when finished shall be, and after the hole is swaged turn off the excess of metal in the lathe.

An improvement upon this method of manufacturing key-pipes was patented to me June 14, 1864; but the improvement therein described involved, as by the old method, the necessity of drilling the wire as well as milling the end which enters the holder, although the advantage of using wire of the same gage as the finished pipe was secured.

The object of my present improvement is to economize the article still further by a process of manufacture which shall dispense with both the drilling and the milling operations above referred to.

In the accompanying drawings, A, Fig. 1, is a piece of sheet metal of the proper size to form after it has been bent so that two of its edges meet and it has been passed through the successive holes of a "draw-plate," the cylder B, Fig. 2.

If it is proposed to make a key-pipe, only a piece of wire, C, Fig. 5, is placed in the other end. The pipe is then swaged in a suitable press, and when the square is withdrawn the article is complete, as shown at D, Fig. 3, with the exception of the screw thread required to be cut upon the shank.

The effect of the swaging operation is to close the longitudinal seam where the edges of the metal of the pipe come together, and at the same time to cause the pipe to close upon the wire which forms the shank and hold it in place, and which, to secure it from turning within the cylinder or being liable to be withdrawn from the same, may be slightly flattened as well as roughened.

If it is desired to make a key instead of a pipe only, the same operation is employed, with the exception that the wire is formed at one end into the desired form for the key, the simplest form for which is shown in Fig. 5.

Instead of the form there shown, any other form of key may be used, it being only necessary that there should be a sufficient length of shank to enter the cylinder to enable the latter when swaged to grasp it with firmness.

What I claim as my invention, and desire to secure by Letters Patent, is—

Making a winding-key or key-pipe in the manner and on the principle substantially as herein described.

GEO. H. FULLER.

Witnesses:
JOHN D. THURSTON,
W. B. VINCENT.